United States Patent

Kalinoski

[11] Patent Number: 5,224,394
[45] Date of Patent: Jul. 6, 1993

[54] ELECTRODE SEAL ASSEMBLY FOR A CERAMIC FLOW TUBE

[75] Inventor: Richard W. Kalinoski, Rumford, R.I.

[73] Assignee: The Foxboro Company, Foxboro, Mass.

[21] Appl. No.: 676,142

[22] Filed: Mar. 27, 1991

[51] Int. Cl.⁵ .............................................. G01F 1/58
[52] U.S. Cl. .............................................. 73/861.12
[58] Field of Search .................. 73/861.12; 29/602.1; 174/78; 204/286, 400

[56] References Cited

U.S. PATENT DOCUMENTS

| | | | |
|---|---|---|---|
| 3,177,709 | 4/1965 | Fischer | 73/861.16 |
| 3,358,075 | 12/1967 | Hunt | 73/861.12 X |
| 3,397,575 | 8/1968 | Ham | 73/861.16 |
| 4,181,013 | 1/1980 | Wada | 73/861.12 |
| 4,297,897 | 11/1981 | Young | 73/861.12 |
| 4,419,899 | 12/1983 | Wada | 73/861.12 |
| 4,420,982 | 12/1983 | Schmoock | 73/861.12 |
| 4,434,666 | 3/1984 | Hemp et al. | 73/861.12 |
| 4,454,766 | 6/1984 | Reinhold et al. | 73/861.12 |
| 4,470,309 | 9/1984 | Wada | 73/861.12 |
| 4,565,619 | 1/1986 | Gardner et al. | 73/861.12 X |
| 4,607,533 | 8/1986 | Kuroda et al. | 73/861.12 |
| 4,773,275 | 9/1988 | Kalinoski | 73/861.12 |
| 4,899,593 | 2/1990 | Inami et al. | 73/861.12 |
| 4,912,838 | 4/1990 | Goto et al. | 29/602.1 |

FOREIGN PATENT DOCUMENTS

| | | | |
|---|---|---|---|
| 2417022 | 10/1975 | Fed. Rep. of Germany | 73/861.12 |
| 3843667 | 7/1989 | Fed. Rep. of Germany | |
| 3908698 | 9/1989 | Fed. Rep. of Germany | |
| 2047409 | 11/1980 | United Kingdom | 73/861.12 |

OTHER PUBLICATIONS

International Search Report and Annex.

Primary Examiner—Michael T. Razavi
Assistant Examiner—Elizabeth L. Shopbell
Attorney, Agent, or Firm—Wolf, Greenfield & Sacks

[57] ABSTRACT

An external electrode seal assembly (10) for magnetic flow meter tubes (12) is disclosed. The assembly includes a polymeric gasket (36) compressed between a head portion of an electrode (17) and an external seal area (18) of a ceramic tube (12). A stem portion (30) of the electrode extends from the head portion (28) to the interior wall (26) of the tube and is in contact with process fluid flowing through the tube. A clamp assembly (42) compresses the polymeric gasket (36) between the head portion (28) of the electrode (17) and the ceramic tube (12) to form the seal.

25 Claims, 3 Drawing Sheets

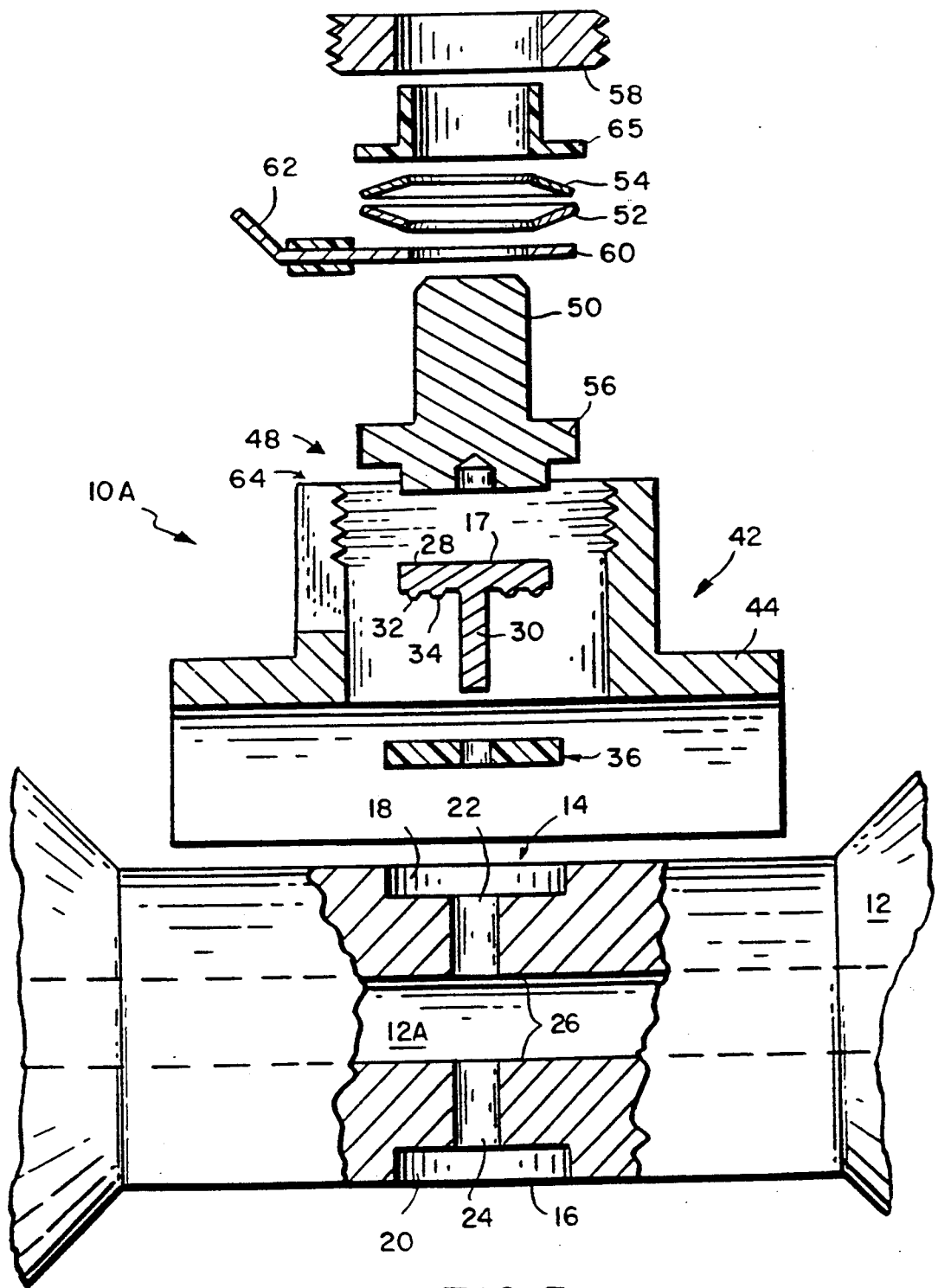

ELECTRODE SEAL ASSEMBLY FOR A CERAMIC FLOW TUBE

FIELD OF THE INVENTION

This invention relates to electrode seals and in particular to electrode seal assemblies in magnetic flow meter tubes.

BACKGROUND OF THE INVENTION

Generally, magnetic flow meters are used to measure volume rates of electrically conductive fluids which present difficult handling problems. Example of such fluids include corrosive acids, sewerage, detergents, and the like. These meters typically include a short section of meter pipe placed in the fluid pipeline. Electrodes are disposed on opposite sides of this tube and in electrical contact with the conductive fluid. Volume rates of the fluids are measured by providing a uniformly distributed magnetic field which is perpendicular to the longitudinal axis of the flowing fluid and at right angles to the electrodes. An instantaneous voltage value is established at the electrodes, which is perpendicular to both the velocity of the fluid and the flux linkages of the magnetic field, and is proportional to the rate of flow of the fluid.

Because of the corrosive and abrasive nature of the fluids, the short meter pipe section is often made of a high purity aluminum oxide ceramic which has excellent corrosive properties and good mechanical stability and strength. A problem associated with using a ceramic pipe section or tube, however, is the inability to seal the electrode to the ceramic given the harsh operating conditions.

To overcome this problem, the present inventor designed an electrode sealing assembly which includes an electrode planted in an interior cavity formed along the inner surface of the meter tube. An electrode stem is connected to the electrode and extends through the walls of the meter tube for external electrical connection. An interior electrode seal is established by placing a multilayer polymer gasket between the electrode and the inner surface of the meter tube. One layer of gasket material is a thin layer of polymeric material, such as perfluoroalhoxyethylene (PFA), which is melted to intimately fill surface variations in the ceramic flow tube seal area. A second thicker teflon gasket layer, such as polytetrafluoroethylene (PTFE), is placed between the thinner teflon gasket layer and the electrode to provide a resilient seal which protects the integrity of the melted-in seal. The electrode is biased against the multi-layer gasket and the interior wall of the ceramic tube by a Belleville washer assembly. The washer assembly, together with the pressure of the fluid flowing in the pipeline, ensures the integrity of the seal despite any future creeping in the gasket due to aging or temperature changes. This seal assembly is described in greater detail in U.S. Pat. No. 4,773,275 issued Sep. 27, 1988 and entitled "Seal For Ceramic Flow Tube." This patent is hereby incorporated by reference.

For a ceramic flow tube having an inner diameter of one half inch or greater, this electrode seal assembly works exceptionally well. A disadvantage of this technique, however, is that it is difficult and expensive to precisely machine the interior cavity of the small ceramic tubes used to house the electrode. Further, it is not practical to use this electrode seal assembly technique to seal electrodes to fractional size ceramic flow tubes having diameters less than one half inch because it becomes an extremely difficult task to make a precise counterbore along the interior wall of the smaller meter pipe. It is also difficult to inspect the interior bored-out cavity to insure its proper tolerances. The process of heating the electrode assembly to melt and bond the polymeric gasket material is also an expensive and time consuming process.

OBJECTIVES OF THE INVENTION

It is therefore an object of this invention to provide an improved electrode seal assembly for a ceramic flow tube.

It is a further object of this invention to provide an electrode seal for fractional size magnetic flow meter tubes.

It is yet a further object of the invention to provide an electrode seal that can be mounted externally.

It is still a further object of the invention to provide an electrode seal to a ceramic flow tube without requiring the step of heating polymeric gasket material to provide a melted-in seal.

It is yet still a further object of the invention to provide an electrode seal which may easily be replaced if found defective.

These and other objects of the invention will appear hereinafter and will become apparent after consideration of the specification with reference to the accompanying drawings and the claims.

SUMMARY OF THE INVENTION

In accordance with the present invention, the electrode seal assembly includes a "thumb tack" shaped electrode which is externally assembled to a seal area on the exterior wall of a ceramic flow tube. The seal area is circumjacent to a shaft passageway that extends through the walls of the tube. A stem portion of the electrode extends through the electrode shaft passageway to the interior wall of the tube and in contact with fluid flowing through the tube. A seal between the electrode and the ceramic tube is established by placing a polymeric gasket between the head portion of the electrode and an external sealing area of the ceramic tube. A single layer of PFA or PTFE could be used to create the necessary seal between the electrode and the ceramic meter tube. A clamp assembly compresses the polymeric gasket between the head portion of the electrode and the ceramic tube to form the seal.

In another embodiment, the polymeric gasket comprises a two-layer polymeric gasket. One layer is preferably a thin layer of perfluoroalhoxyethylene (PFA) and is positioned adjacent to the exterior wall of the ceramic tube. The other layer is a thicker layer of polytetrafluoroethylene (PTFE) and is placed between the first gasket layer and the head portion of the electrode. The electrode seal assembly is heated to melt the first gasket layer to a fluid state for filling the rough surface sealing area of the ceramic tube and allowed to cool. Heating the PFA gasket layer allows it to bond to the ceramic tube and the second gasket layer thereby producing a resilient high temperature seal.

In yet another embodiment, the external sealing area of the ceramic meter tube is polished to a substantially smooth surface. By polishing the external sealing surface area, the process of heating the thin layer of PFA to a area of the ceramic can be avoided.

BRIEF DESCRIPTION OF THE DRAWINGS

The foregoing and other objects, features and advantages of this invention will be apparent from the following and more particular description of the preferred embodiments of the invention, as illustrated in the accompanying drawings in which like reference characteristics refer to the same parts throughout the different views. The drawings are not necessarily to scale, emphasis instead is placed upon illustrating the principles of the invention.

FIG. 2 is a partially broken away side elevation view of an alternative multilayer gasket.

FIG. 3 is an exploded partly- sectional and partly-cut away view of one of the electrode seal assemblies shown in FIG. 1.

DETAIL DESCRIPTION OF THE INVENTION

The electrode seal assembly of the present invention includes an electrode which is externally assembled to a ceramic flow tube. The electrode has a head portion which is fitted to a cavity bored into the exterior wall of the tube and a stem portion which extends from the head portion to the interior wall of the tube and is in contact with the process fluid. A seal is established between the electrode and the ceramic tube by placing a polymeric gasket between the head portion of the electrode and the ceramic tube. A clamp assembly compresses the polymeric gasket between the head portion of the electrode and a sealing area, formed by boring a cavity into the ceramic tube, to prevent the gasket from separating from either the tube or the electrode as a result of expansion or contraction in the whole electrode seal assembly.

The present invention offers several advantages over the prior art electrode seal assemblies. The most significant advantage is that it can easily and quickly be assembled. If the electrode becomes worn and defective or the seal is breached, the electrode seal assembly can easily and quickly disassembled and replaced with a new electrode and seal. There is no damage to the more expensive ceramic tube. Another advantage is that the electrode seal assembly is less expensive to manufacture than prior art seal assemblies. The cavities bored into the exterior wall of the ceramic tube to create the seal area are accomplished using conventional boring techniques. These exterior bores can be easily inspected with precision. The time consuming and expensive process of heating the assembly to melt the gasket material to fill the rough surface of the ceramic tube and bond it to the ceramic can be avoided by a secondary grinding or polishing of the surfaces of the cavities. Polishing the surfaces of the seal areas removes crevices in the ceramic and prevents possible leakage paths between the gasket and the ceramic tube. For prior art devices having internal sealing assemblies, secondary grinding or polishing the internal seal areas of the ceramic tubes would not be practical. Other advantages will become apparent in the detailed description below.

Figure 1:
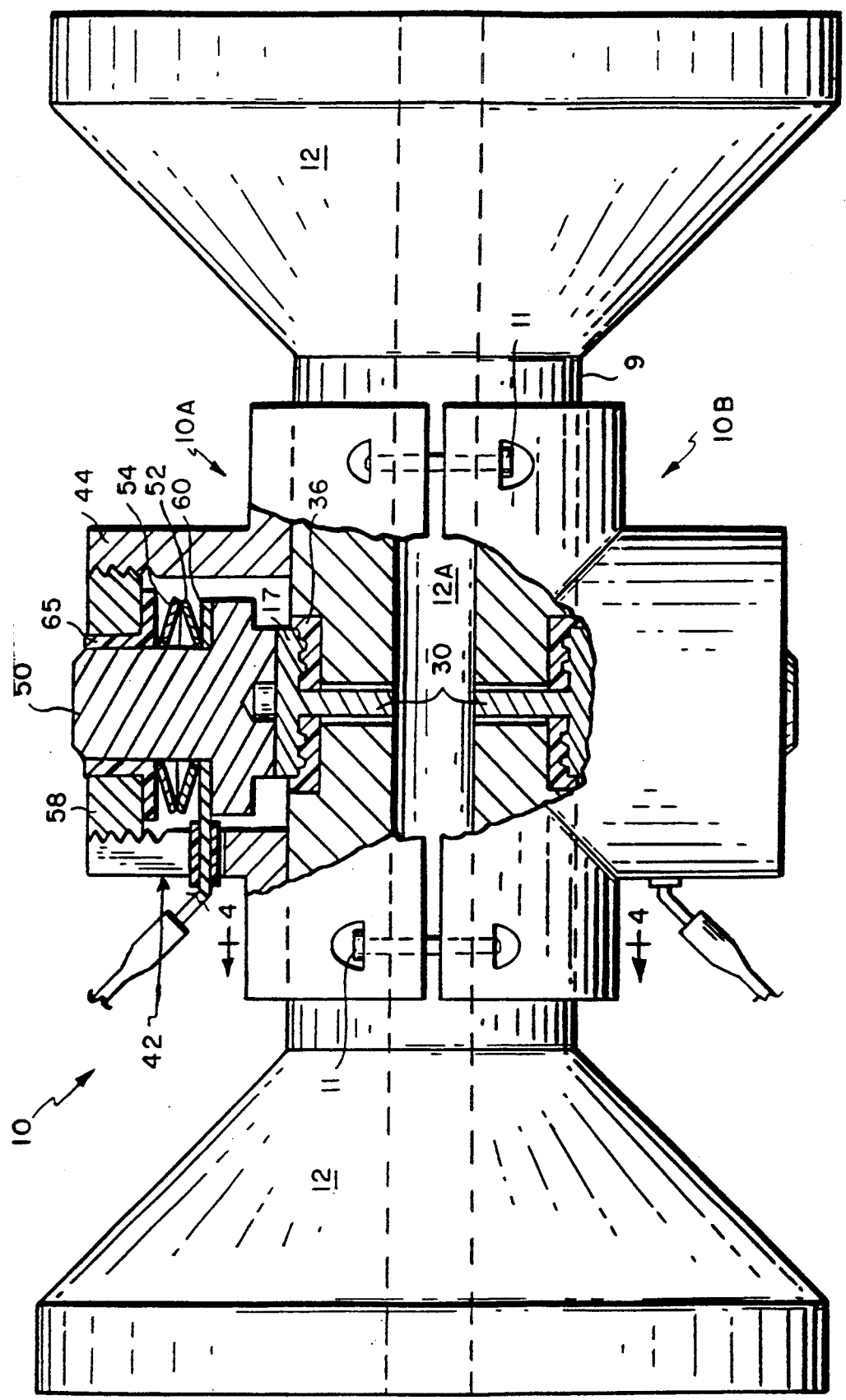
FIG. 1 is a partially broken away side elevation view of a ceramic flow tube assembly showing an improved electrode seal assembly of the present invention.

A preferred embodiment of the electrode seal assembly 10 for a ceramic flow tube 12 used in a magnetic flow meter is shown in FIG. 1. Generally, the assembly comprises two halves 10A and 10B securely coupled together around the exterior wall 9 of tube 12 ceramic tube by screws 11. For clarity and simplification, a detailed description of only the upper half 10A is presented. The lower half 10B is a mirror image of the upper half 10A.

As shown in one or both of FIGS. 1 and 3, the ceramic tube 12 includes two external cavities 14 and 16 formed using conventional boring techniques to allow an electrode 17 to be externally placed in contact with process fluid flowing through the tube 12 having fluid conduit 12A. These cavities 14 and 16 each include a seal area 18 or 20 respectively, and a conduit 22 or 24, respectively, extending to the interior wall 26 of the ceramic tube 12. These cavities 14, 16 are formed on opposite sides of the ceramic tube and are axially aligned with the other. The ceramic seal areas 18 and 20 can be subjected to a secondary grinding to remove the rough fired surface area and obtain a substantially smooth, sealing surface, as will be discussed below. The surface can be then polished if a high finish is desired for maximum sealing.

The electrode 17 is preferably "thumb tack" shaped and includes a head portion 28, which is generally a flat disk, and a stem portion 30 extending from the head portion as shown. The electrode is made of material, such as platinum, which is electrically conductive and corrosive-resistant. The underside of the head portion of the electrode 17 is machined to include two annular seal teeth 32 and 34 which are pressed into a donut gasket 36 disposed between the electrode 17 and the ceramic tube 12 by a clamp assembly 42 (discussed below). The stem portion 30 passes through the conduit 22 or 24 and has a length which allows it to be flush with the interior wall 26 of the ceramic tube 12 and in contact with the process fluid. Care should be taken to prevent the stem from extending into the process fluid as that would induce flow turbulence at the electrode site and could cause mechanical damage to the electrode or impair the seal.

The gasket 36 is generally annular and has an inner diameter constructed to accept the electrode stem portion 30 and has an exterior diameter which fits within the diameter of the seal area 18. Depending on the particular application of the external seal, a single gasket or multilayer gasket may be used. Tests have demonstrated that a leak-tight seal can be maintained up to 1500 psi using a single thin layer (0.25 mm) of PFA or PTFE Teflon material compressed against an as-fired ceramic counterbored seal area. This is the simplest, lowest cost approach. Alternately, the seal area can be subjected to a secondary grinding to remove the generally rough surface area of the as fired ceramic tube and/or the gasket can be bonded to the ceramic tube by heating and melting the gasket.

In accordance with a preferred embodiment, a multilayer gasket is formed from two layers of polymer material as shown in FIG. 2. The first layer 38 of the multilayer gasket is a thin (for example 0.25 mm) layer of PFA and is positioned adjacent to the seal area. PFA is chosen as. a gasket material because it has good chemical resistance characteristics. PFA can also be melted for bonding it to the ceramic. Bonding the PFA gasket to the ceramic surface may be preferred if the seal area is not smoothed by grinding or polishing. The second layer 40 is preferably thicker (for example 0.63 mm) and is composed of PTFE which also has good chemical resistance characteristics. This gasket is positioned between the thinner layer 38 and the electrode head portion 28. The thickness of the PTFE layer should be such that it accommodates the depth of any penetration from the teeth on the head portion of the electrode 17 and provides some resilience and flexibility for thermal compression and expansion without unnecessary creeping. PTFE is preferred if the first layer is bonded to the ceramic since it does not melt to a liquid state, but rather turns to a viscous, non-flowing, gel-type substance. Together, the composite of PFA, with its bonding properties, and PTFE, with its low flow characteristics in the molten state, provide the desired dimensional control and seal quality. Both the single layer and multilayer seal are impervious to the process fluid and are stable throughout the operative range of the meter tube ($-40$ F to $400$ F).

Figure 4:
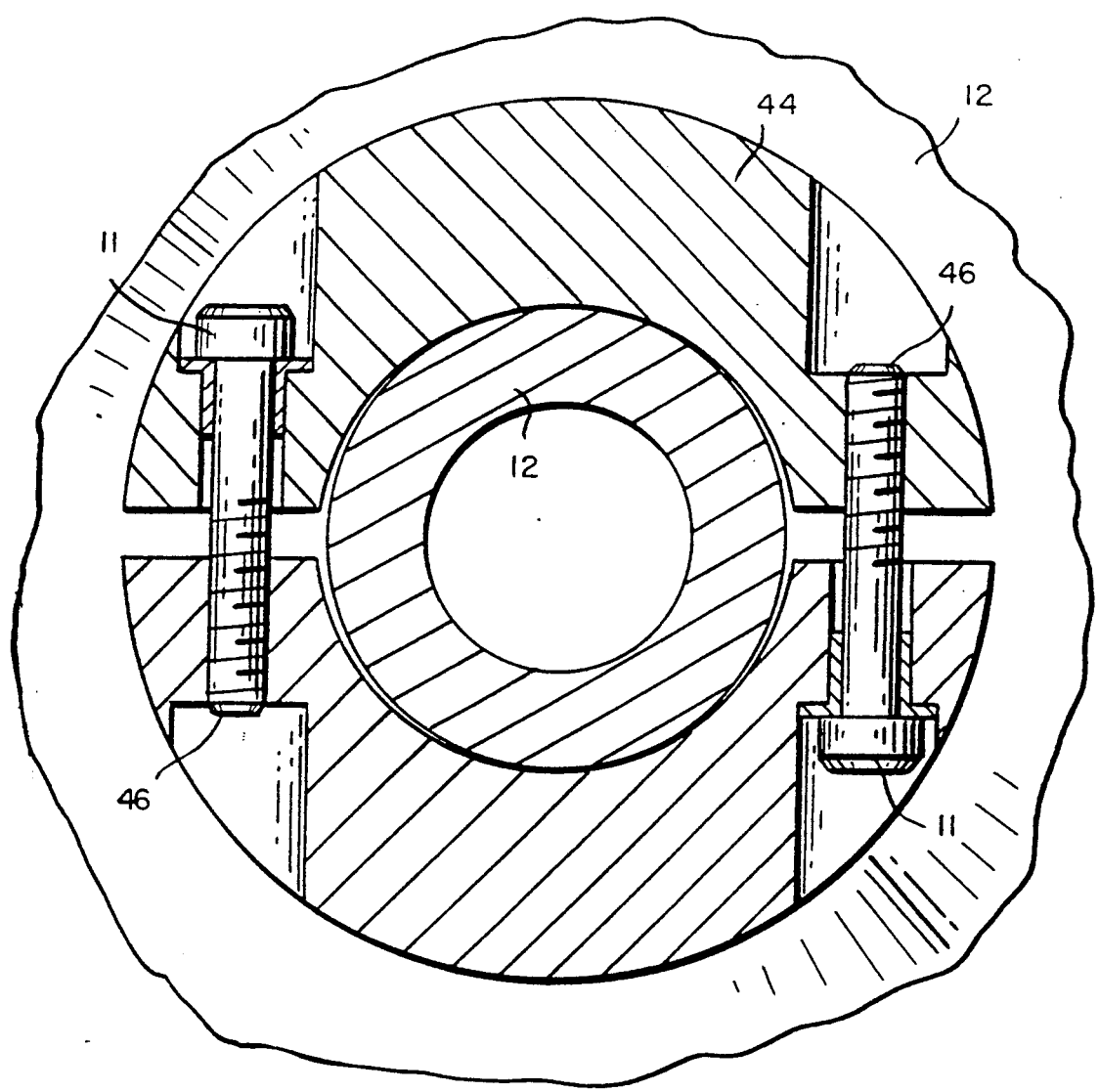
FIG. 4 is a sectional view of the clamp housing of FIG. 1 at section line 4—4.

Referring now to FIGS. 1, 3 and 4, the clamp assembly 42 includes a housing 44 which is preferably made of aluminum and resembles a elongated tube split longitudinally along its axis. The housing 44 has an inner diameter which is slightly larger than the exterior diameter of the ceramic tube. Screw holes 46 are provided for securing the two clamp housing halves 44A, 44B around the ceramic tube 12 as shown in FIG. 4. Each housing half 44A, 44B further includes a threaded port 48 which provides access to an electrode 17. The clamp assembly port is closed by an annular contact cap 50 which is biased against the electrode 17 by two compressed Belleville washers 52 and 54 placed over a neck portion of the contact cap 50. The bottom 51 of the contact cap 50 preferably has a diameter which is equal to the diameter of the head portion 28 of the electrode 17 for evenly applying a force across the surface of head portion 28.

The Belleville washers 52 and 54 are compressed between the flange 56 of the contact cap 50 and a lid 58 threaded to the clamp housing 44. External electrical contact with the electrode is made by a spade lug 60 disposed between the Belleville washers and the flange of the contact cap. The spade lug has a contact lead portion 62 which extends through a slot 64 in the wall of the clamp housing 44; portion 62 of spade lug 60 is insulated with shrink wrap tubing where it passes through housing 44. In addition, an electrical insulator 65 is provided to insulate the housing 44 from the electrode 50. The contact cap 50 and the spade lug 60 are preferably gold plated for good electrical connection to the electrode. Alternately, the spade lug could be welded to the head portion of the electrode.

The Belleville washers are compressed to force the underside of the electrode head portion to close against the gasket so as to drive the seal teeth 36 and 38 into the surface of the gasket layer. Since the fluid pressure on the seal opposes the Belleville washers, they must exert a net force which is substantially greater than the net force which the maximum working pressure exerts on the seal. In other words, the net force exerted by the Belleville washers to drive the electrode 17 against the gasket and ceramic tube must be greater than the net force exerted on the smaller electrode area in contact with the process fluid. This is necessary to insure that the gasket remains in compression and maintains a mass spectrometer leak tight seal. Otherwise, if the Belleville force is either approached or exceeded, a leak will result. A good rule of thumb might be that the net force exerted by the Belleville washers has to be three times the net force exerted by the internal pressure times seal area to insure a good seal. Following this rule would avoid the effect of creep of the gasket due to aging or temperature changes, relaxation of the Bellville washers or expansion or contraction in the whole assembly.

While there has been shown and described what are considered to be the preferred embodiments of the invention, it will be apparent to those skilled in the art that various changes and modifications can be made herein without departing from the scope of the invention as defined by the appended claims. For example, the gasket can be comprised of one layer of PFA, PTFE or similar material or three or more layers of gasket material.

I claim:

1. An electrode sealing arrangement in an electromagnetic flow meter for measuring the flow of a process fluid comprising:
   a ceramic flow tube having an interior and an exterior wall, an electrode shaft passageway extending through the walls of the tube, and a seal area on the exterior wall of the tube circumjacent said shaft passageway;
   an electrode having a head portion and a stem portion, wherein said stem portion is placed within said shaft passageway and extends to at least said interior wall so as to be in contact with the process fluid passing through said ceramic flow tube;
   a polymeric gasket means placed between the head portion of said electrode and the seal area on the exterior wall of the tube; and
   bias means for applying a substantially linear force to the head portion of said electrode to compress said polymeric gasket means between the head portion and the seal area to provide a seal.

2. The electrode sealing arrangement of claim 1 wherein said seal area includes a flat surface area perpendicular to the axis of the stem portion of the electrode.

3. The electrode sealing arrangement of claim 2 wherein said seal area is formed by boring a cavity into the exterior wall of the ceramic flow tube.

4. The electrode sealing arrangement of claim 2 wherein said flat surface area is subjected to a secondary grinding to form a substantially smooth surface area.

5. The electrode sealing arrangement of claim 1 wherein said polymer gasket means consists essentially of a gasket material that is substantially impervious to the process fluid.

6. The electrode sealing arrangement of claim 1 wherein said polymer gasket means consists essentially of a PFA gasket.

7. The electrode sealing arrangement of claim 1 wherein said polymeric gasket means consists essentially of a PTFE gasket.

8. The electrode sealing arrangement of claim 1 wherein said polymeric gasket means comprises at least two layers of polymeric material.

9. The electrode sealing arrangement of claim 8 wherein the layer of polymeric material adjacent to the seal area is bonded to the flow tube.

10. The electrode sealing arrangement of claim 8 wherein the layer of polymeric material adjacent to the seal area is a PFA teflon gasket and the other layer is a PTFE teflon gasket.

11. The electrode sealing arrangement of claim 1 wherein said bias means is a Belleville washer assembly.

12. The electrode sealing arrangement of claim 1 wherein said electrode has at least one cylindrical ridge on said head portion adjacent to said polymeric gasket means.

13. An electrode sealing arrangement for a fractional size electromagnetic flow meter for measuring the flow of a process fluid in an operative temperature range comprising:
   a ceramic flow tube having an interior and an exterior wall, an electrode shaft passageway extending through the wall of the tube, and a substantially flat seal area on the exterior wall of the tube circumjacent and perpendicular to said shaft passageway;
   an electrode having a head portion and a stem portion, wherein said stem portion is placed within said shaft passageway so as to extend through said tube and be in contact with the process fluid passing through said ceramic flow tube when in use;
   a polymeric gasket means placed between the head portion of said electrode and the seal area on the exterior wall of the tube; and
   bias means for applying a substantially linear force to the head portion of said electrode to compress said polymeric gasket means between the head portion and the seal area to provide a seal.

14. The electrode sealing arrangement of claim 13 wherein said seal area is formed by boring a cavity into the exterior wall of the ceramic flow tube.

15. The electrode sealing arrangement of claim 13 wherein said flat surface area is polished to form a substantially smooth surface area.

16. The electrode sealing arrangement of claim 13 wherein said polymeric gasket means consists essentially of a gasket material that is substantially impervious to the process fluid in the operative temperature range.

17. The electrode sealing arrangement of claim 13 wherein said polymeric gasket means consists essentially of a PFA teflon gasket.

18. The electrode sealing arrangement of claim 13 wherein said polymeric gasket means consists essentially of a PTFE teflon gasket.

19. The electrode sealing arrangement of claim 13 wherein said polymeric gasket means comprises at least two layers of polymeric material.

20. The electrode sealing arrangement of claim 19 wherein the layer of polymeric material adjacent to the seal area is bonded to the flow tube.

21. The electrode sealing arrangement of claim 19 wherein the layer of polymeric material adjacent to the seal area is a PFA gasket and the other layer is a PTFE gasket.

22. The electrode sealing arrangement of claim 13 wherein said bias means is a Belleville washer assembly.

23. The electrode sealing arrangement of claim 13 wherein said electrode has at least one cylindrical ridge on said head portion adjacent to said polymeric gasket means.

24. An electrode sealing arrangement for an electromagnetic flow meter comprising:
   a ceramic flow tube having an interior and an exterior wall, an electrode shaft passageway extending through the walls of the tube, and a substantially flat seal area on the exterior wall of the tube circumjacent and perpendicular to said shaft passageway;
   an electrode having a head portion and a stem portion, said stem portion extending through said tube walls via the electrode shaft passageway, to contact fluid passing through said ceramic flow tube and said head portion having at least one annular ring formed on the surface of the head portion and extending toward the seal area when said stem portion is placed within said shaft passageway;
   a multiple layer polymeric gasket means placed between the head portion of said electrode and the seal area on the exterior wall of the tube, wherein one layer is bonded to the seal area of the tube; and
   bias means for applying a substantially linear force to the head portion of said electrode to compress said polymeric gasket means between the head portion and the seal area to provide a seal.

25. The electrode sealing arrangement of claim 24 wherein the layer of polymeric material adjacent to the seal area is a PFA teflon gasket and another layer is a PTFE teflon gasket.

* * * * *